(12) United States Patent
Luschi et al.

(10) Patent No.: US 8,582,703 B2
(45) Date of Patent: Nov. 12, 2013

(54) ESTIMATION OF SIGNAL AND INTERFERENCE POWER

(75) Inventors: Carlo Luschi, Oxford (GB); Gang Wang, Bristol (GB); Abdelkader Medles, Bristol (GB); Jonathan Wallington, North Somerset (GB)

(73) Assignee: Icera, Inc., Wilmington, DE (US)

( * ) Notice: Subject to any disclaimer, the term of this patent is extended or adjusted under 35 U.S.C. 154(b) by 89 days.

(21) Appl. No.: 13/260,705

(22) PCT Filed: Mar. 25, 2010

(86) PCT No.: PCT/EP2010/053959
§ 371 (c)(1),
(2), (4) Date: Dec. 8, 2011

(87) PCT Pub. No.: WO2010/108998
PCT Pub. Date: Sep. 30, 2010

(65) Prior Publication Data
US 2012/0076189 A1    Mar. 29, 2012

(30) Foreign Application Priority Data
Mar. 27, 2009 (GB) .................................. 0905357.0

(51) Int. Cl.
*H03D 1/04* (2006.01)
(52) U.S. Cl.
USPC ............ 375/346; 375/341; 370/252; 370/328
(58) Field of Classification Search
USPC .......... 375/346, 341, 260, 222; 370/252, 328, 370/329, 335
See application file for complete search history.

(56) References Cited

U.S. PATENT DOCUMENTS

| 6,515,980 | B1 * | 2/2003 | Bottomley ................... 370/342 |
| 7,218,617 | B1 * | 5/2007 | Usuda et al. ................... 370/320 |
| 7,634,235 | B2 * | 12/2009 | Catreux-Erceg et al. .. 455/67.11 |
| 7,711,041 | B2 * | 5/2010 | Do et al. ....................... 375/222 |
| 7,808,883 | B2 * | 10/2010 | Green .......................... 370/208 |
| 7,830,818 | B2 * | 11/2010 | Nibe ............................ 370/252 |
| 8,275,023 | B2 * | 9/2012 | Wang et al. ................... 375/150 |
| 2003/0003939 | A1 | 1/2003 | Banerjee |
| 2004/0028154 | A1 * | 2/2004 | Yellin et al. ................... 375/341 |

(Continued)

FOREIGN PATENT DOCUMENTS

WO    2010108998 A1    9/2010

*Primary Examiner* — Daniel Washburn
*Assistant Examiner* — Berhanu Tadese

(57) ABSTRACT

Wireless receiver and method of operating a wireless receiver in a wireless communication network for: receiving a signal, the received signal comprising data containing at least one symbol from a symbol alphabet, the symbol alphabet consisting of complex values that define a direction in the complex plane, the received signal further comprising interference; measuring the variance of a first component of the received signal that is perpendicular to the defined direction in the complex plane; estimating the interference power of the received signal using the measured variance of the first component of the received signal; estimating a total power of the received signal; estimating the power of the at least one symbol of the received signal by subtracting the estimated interference power from the estimated total power of the received signal; and based on the estimated interference power and the estimated power of the at least one symbol of the received signal, performing at least one of the steps of: processing the received signal, and generating control information related to the transmission of a further signal from the wireless receiver.

27 Claims, 5 Drawing Sheets

(56) References Cited

U.S. PATENT DOCUMENTS

| | | | |
|---|---|---|---|
| 2004/0109422 A1* | 6/2004 | Naito | 370/328 |
| 2004/0259584 A1* | 12/2004 | Murata et al. | 455/522 |
| 2006/0092905 A1* | 5/2006 | Do et al. | 370/342 |
| 2006/0245397 A1* | 11/2006 | Zhang | 370/335 |
| 2006/0256757 A1* | 11/2006 | Kuusela et al. | 370/335 |
| 2007/0121554 A1* | 5/2007 | Luo et al. | 370/335 |
| 2007/0189364 A1* | 8/2007 | Wang et al. | 375/148 |
| 2007/0280147 A1* | 12/2007 | Catreux-Erceg et al. | 370/318 |
| 2008/0316934 A1* | 12/2008 | Nibe | 370/252 |
| 2009/0291642 A1* | 11/2009 | Cozzo et al. | 455/67.13 |
| 2009/0312048 A1* | 12/2009 | Vanganuru et al. | 455/522 |
| 2009/0316842 A1* | 12/2009 | Lu et al. | 375/346 |
| 2010/0002785 A1* | 1/2010 | Mantravadi et al. | 375/260 |
| 2010/0020704 A1* | 1/2010 | Hu et al. | 370/252 |
| 2010/0284500 A1* | 11/2010 | Luschi et al. | 375/346 |
| 2010/0303030 A1* | 12/2010 | Andersson | 370/329 |
| 2010/0309850 A1* | 12/2010 | Andrews et al. | 370/328 |
| 2012/0028644 A1* | 2/2012 | Li | 455/436 |

* cited by examiner

ESTIMATION OF SIGNAL AND INTERFERENCE POWER

CROSS-REFERENCE TO RELATED APPLICATION

This application is the National Stage and therefore claims the benefit of International Application No. PCT/EP2010/053959 filed on Mar. 25, 2010 by Carlo Luschi, et al., entitled "ESTIMATION OF SIGNAL AND INTERFERENCE POWER," which was published in English under International Publication Number WO 2010/108998 A1 on Sep. 30, 2010, and has a priority date of Mar. 27, 2009, based on application GB 0905357.0. Both of the above applications are commonly assigned with this National Stage application and are incorporated herein by reference in their entirety.

This invention relates to the estimation of signal and interference power in a wireless communication system.

The estimation of the signal and interference powers in a wireless communication receiver is a fundamental task for a number of signal processing functions in a wireless communication system. For example, the estimated signal and interference powers, or their ratio, may be used (i) to generate channel quality estimates for transmit power control feedback; (ii) to assess if the quality of a link has dropped so low that a call using the link should be terminated ("out-of-sync"); or (iii) to calculate reliability information (e.g. log-likelihood ratios), for example for input into soft decoders.

In the following, the term interference will be used to address the overall disturbance affecting the received signal, including, e.g., the thermal noise associated with the received signal in a wireless communication receiver.

To assist in the estimation of the signal and interference powers, a wireless communication transmitter may provide an amplitude reference by the transmission of known pilot symbols. In $3^{rd}$ Generation Partnership Project (3GPP) Wideband Code Division Multiple Access (WCDMA) systems employing a Dedicated Physical Channel (DPCH) on the downlink the transmission of known symbols is accomplished by the transmission of pilot bits in the Dedicated Physical Control Channel (DPCCH) which is the part of the DPCH used for control information. The DPCCH is defined in 3GPP TS 25.211, "Technical Specification Group Radio Access Network: Physical Channels and Mapping of Transport Channels onto Physical Channels (FDD)", November 2007, Section 5.3.2.

For reasons such as efficiency in the utilization of the downlink resources, it may not be always possible or desirable to transmit extra information, such as pilot symbols, in order for the signal and interference powers to be estimated. One example of a system where pilot information is absent is the 3GPP Release 6 downlink channel called the Fractional DPCH (F-DPCH), which is defined in 3GPP TS 25.211, "Technical Specification Group Radio Access Network: Physical Channels and Mapping of Transport Channels onto Physical Channels (FDD)", November 2007, Section 5.3.2.6.

WO 2006/122805 discloses a method and apparatus in which power control feedback is generated for a control channel signal that is received in conjunction with a reference channel (e.g. a Common Pilot Channel (CPICH)) based on the reference channel's signal strength or quality, and an estimate of a gain factor relating the control and reference channel signals. Although this method does not rely on the availability of pilot symbols in order to generate power control feedback, the method of WO 2006/122805 relies on a reference channel signal (e.g. a CPICH) and an estimation of the gain factor between the control channel signal and the reference channel signal.

A method for accurately estimating signal and interference powers is required that does not assume the availability of pilot bits or the availability of a reference channel signal.

In a first aspect of the present invention there is provided a method of operating a wireless receiver in a wireless communication network, the method comprising: receiving a signal, the received signal comprising data containing at least one symbol from a symbol alphabet, the symbol alphabet consisting of complex values that define a direction in the complex plane, the received signal further comprising interference; measuring the variance of a first component of the received signal that is perpendicular to the defined direction in the complex plane; estimating the interference power of the received signal using the measured variance of the first component of the received signal; estimating a total power of the received signal; estimating the power of the at least one symbol of the received signal by subtracting the estimated interference power from the estimated total power of the received signal; and based on the estimated interference power and the estimated power of the at least one symbol of the received signal, performing at least one of the steps of: processing the received signal, and generating control information related to the transmission of a further signal from the wireless receiver.

In a preferred embodiment the symbol alphabet is a binary symbol alphabet consisting of a first complex value and a second complex value, the second complex value being the negative of the first complex value. Preferably, the symbols are Transmit Power Control symbols which indicate whether the power of the transmission from the wireless receiver should be increased or decreased.

In one embodiment the method further comprises measuring the variance of the received signal, wherein the total power of the received signal is estimated using the measured variance of the received signal. In another embodiment, the method further comprises measuring the variance of a second component of the received signal that is parallel to the defined direction in the complex plane, wherein the total power of the received signal is estimated using the measured variance of the second component of the received signal.

In preferred embodiments the method further comprises estimating a signal to interference ratio of the received signal using the estimated interference power and the estimated power of the at least one symbol of the received signal, wherein the step of decoding the received signal or the step of controlling the transmission is performed in dependence on the estimated signal to interference ratio.

In some embodiments the received signal contains a plurality of fractional dedicated physical channels sharing one channelization code, wherein the interference power of the received signal is estimated using the received signal on each of the fractional dedicated physical channels. The method may further comprise estimating a phase of the received signal on each of the fractional dedicated physical channels and applying a respective suitable de-rotation to the received signal on each of the fractional dedicated physical channels in dependence on the respective estimated phases.

Preferably the method further comprises applying a time averaging filter to at least one of the estimated interference power and the estimated power of the at least one symbol of the received signal.

In some embodiments pilot symbols are received on a dedicated physical channel to provide an amplitude reference for use in estimating the interference power and in estimating the power of the at least one symbol of the received signal.

The method may further comprise calculating bit reliability information using the estimated interference power and the estimated power of the at least one symbol of the received signal, wherein the received signal is decoded in dependence on the calculated reliability information.

The step of processing the received signal may comprise at least one of the steps of: decoding the received signal, calculating reliability information, determining or scaling threshold values for the selection of one of a plurality of channel estimation algorithms, diverting processing resources, selecting one of a plurality of receiver processing or detection algorithms, and selecting one of a plurality of timing or frequency synchronization algorithms. The method may further comprise determining whether to terminate a link on which the signal is received based on the estimated interference power and the estimated power of the at least one symbol.

In a second aspect of the present invention there is provided a wireless receiver for use in a wireless communication network, the apparatus comprising: means for receiving a signal, the received signal comprising data containing at least one symbol from a symbol alphabet, the symbol alphabet consisting of complex values that define a direction in the complex plane, the received signal further comprising interference; means for measuring the variance of a first component of the received signal that is perpendicular to the defined direction in the complex plane; means for estimating the interference power of the received signal using the measured variance of the first component of the received signal; means for estimating a total power of the received signal; means for estimating the power of the at least one symbol of the received signal by subtracting the estimated interference power from the estimated total power of the received signal; and means for performing, based on the estimated interference power and the estimated power of the at least one symbol of the received signal, at least one of the steps of: processing the received signal, and generating control information related to the transmission of a further signal from the wireless receiver.

In a preferred embodiment the symbol alphabet is a binary symbol alphabet consisting of a first complex value and a second complex value, the second complex value being the negative of the first complex value. Preferably the symbols are Transmit Power Control symbols which indicate whether the power of the transmission from the wireless receiver should be increased or decreased.

In one embodiment the receiver further comprises means for measuring the variance of the received signal, wherein the total power of the received signal is estimated using the measured variance of the received signal. In another embodiment the receiver further comprises means for measuring the variance of a second component of the received signal that is parallel to the defined direction in the complex plane, wherein the total power of the received signal is estimated using the measured variance of the second component of the received signal.

In preferred embodiments the receiver further comprises means for estimating a signal to interference ratio of the received signal using the estimated interference power and the estimated power of the at least one symbol of the received signal, wherein the step of decoding the received signal or the step of controlling the transmission is performed in dependence on the estimated signal to interference ratio.

In some embodiments the received signal contains a plurality of fractional dedicated physical channels sharing one channelization code and wherein the means for estimating interference power of the received signal uses the received signal on each of the fractional dedicated physical channels. The receiver may further comprise means for estimating a phase of the received signal on each of the fractional dedicated physical channels and means for applying a respective suitable de-rotation to the received signal on each of the fractional dedicated physical channels in dependence on the respective estimated phases.

Preferably the receiver comprises means for applying a time averaging filter to at least one of the estimated interference power and the estimated power of the at least one symbol of the received signal.

In some embodiments pilot symbols are received on a dedicated physical channel to provide an amplitude reference for use by the means for estimating the interference power and the means for estimating the power of the at least one symbol of the received signal.

The receiver may further comprise means for calculating bit reliability information using the estimated interference power and the estimated power of the at least one symbol of the received signal, wherein the received signal is decoded in dependence on the calculated reliability information.

In the receiver, the step of processing the received signal may comprise at least one of the steps of: decoding the received signal, calculating reliability information, determining or scaling threshold values for the selection of one of a plurality of channel estimation algorithms, diverting processing resources, selecting one of a plurality of receiver processing or detection algorithms, and selecting one of a plurality of timing or frequency synchronization algorithms. The receiver may further comprise means for determining whether to terminate a link on which the signal is received based on the estimated interference power and the estimated power of the at least one symbol.

A computer readable medium may be provided comprising computer readable instructions for performing the above method.

In a third aspect of the present invention there is provided a method of generating an estimate of symbol power and an estimate of interference power of a received signal in a wireless communication network, the method comprising: receiving the signal, the received signal comprising data containing at least one symbol from a symbol alphabet, the symbol alphabet consisting of complex values that define a direction in the complex plane, the received signal further comprising interference; measuring the variance of a first component of the received signal that is perpendicular to the defined direction in the complex plane; estimating the interference power of the received signal using the measured variance of the first component of the received signal; estimating a total power of the received signal; and estimating the power of the at least one symbol of the received signal by subtracting the estimated interference power from the estimated total power of the received signal.

The method may further comprise adjusting one or more parameters related to the receiver architecture or the receiver implementation based on the estimated interference power and the estimated power of the at least one symbol of the received signal.

For a better understanding of the present invention and to show how the same may be put into effect, reference will now be made, by way of example, to the following drawings in which.

Figure 1:
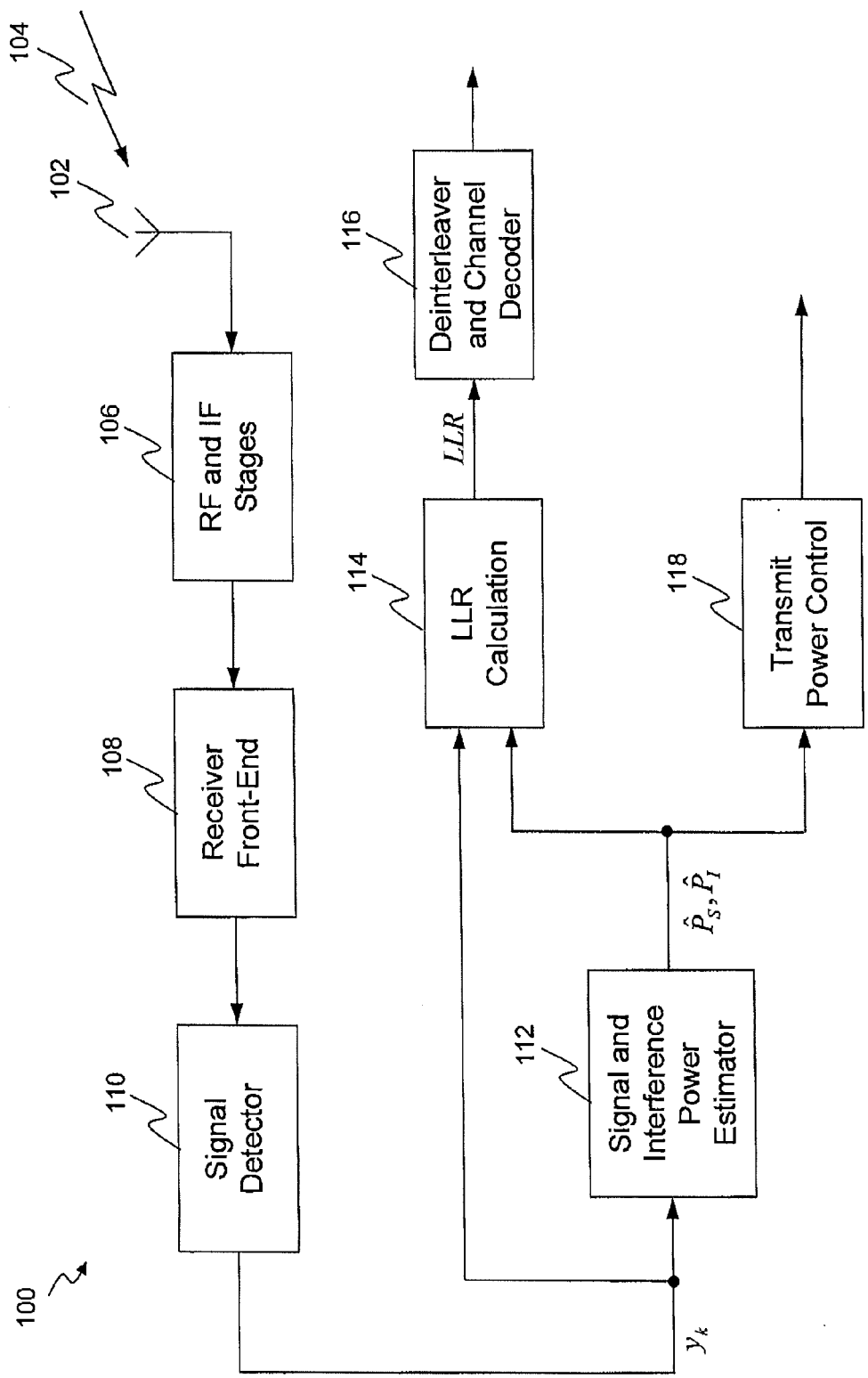
FIG. 1 is a schematic block diagram showing the dataflow in a wireless receiver according to a preferred embodiment.

Throughout this description, as would be clear to a person skilled in the art, the term "received signal" is used to mean the total signal received at the receiver, including the useful part of the signal (i.e. the data) plus any interference that is received. However, the term "signal power" is used to mean the power of the useful part of the received signal, i.e. the power of the received data.

For interference-limited wireless systems, such as those based on Code Division Multiple Access (CDMA) technology, it is important to apply a Transmit Power Control (TPC) mechanism to ensure that sufficient but not excessive power is transmitted by each transmitter in the network, to achieve an adequate received signal quality for each individual transmission. In a 3GPP WCDMA system, the power control mechanism comprises two parts: firstly, an "outer-loop" which sets and adjusts a target signal-to-interference power ratio (SIR) in order to meet a block error rate (BLER) target set by the network; and secondly, an "inner-loop" which provides fast feedback to a transmitter so that the transmitter can adjust its transmitted signal power in order that the received SIR target is met. The inner-loop transmit power control is typically based on a comparison between a target SIR and an SIR estimated from the received signal.

In 3GPP High-Speed Downlink Packet Access (HSDPA), high data rate packet transmission is achieved by scheduling different users on the High-Speed Downlink Shared Channel (HS-DSCH). In the 3GPP Release 5 specifications, each User Equipment (UE) that is admitted to share the downlink HS-DSCH resources requires the transmission of a respective associated DPCH downlink channel. The main purpose of the associated DPCH downlink channels is to maintain the operation of inner-loop power control on the downlink and uplink. Transmit Power Control (TPC) bits are included in the DPCCH in order to transfer the power control information between the wireless network base station and the UE. Uplink power control information, which is transmitted in the TPC bits of the downlink DPCCH, is necessary to maintain link adaptation for the transmission of higher layer control signalling on the uplink DPCH. Downlink power control information, which is transmitted in the TPC bits of the uplink DPCCH, may be reused for the transmission of HSDPA physical layer signalling on the High-Speed Shared Control Channel (HS-SCCH). Each associated downlink DPCH requires the allocation of one downlink Orthogonal Variable Spreading Factor (OVSF) channelization code. Therefore, in the presence of multiple HSDPA UEs, the transmission of the associated DPCH channels can consume a significant portion of the available downlink code tree resources (i.e., of the available downlink OVSF channelization codes). This limits the maximum number of HSDPA UEs that can be simultaneously supported without reducing the number of downlink codes reserved for data transmission on the HS-DSCH. To improve the code utilization efficiency, 3GPP Release 6 specifications has introduced the F-DPCH channel, which only carries the downlink TPC command for uplink power control. Support of the F-DPCH is mandatory for HSDPA UEs from the Release 6 specification onwards. The use of F-DPCH allows one channelization code to be shared among up to ten F-DPCH channels in a time-multiplexed fashion. However, the use of F-DPCH complicates the operation of transmit power control at the UE, because an F-DPCH time slot only contains one TPC symbol and does not contain any known pilot symbols. Therefore the F-DPCH does not contain enough information to provide an estimate of the received signal and interference powers using the methods of the prior art.

For a power control scheme based on the F-DPCH, for which there is no concept of block error rate, the outer-loop operation is based on a target SIR corresponding to a quality measure typically given by a TPC command error rate (CER) target. The inner-loop will then continue to operate by comparing the estimated SIR with the target SIR, so that a transmitter can adjust its transmitted signal power in order to meet the target F-DPCH quality.

In this case, the power control algorithm may include the following steps:
- pre-simulate and generate a table of estimated SIR vs. TPC CER;
- find the SIR estimate corresponding to the target TPC CER, which is taken as the value of target SIR; and
- for each F-DPCH slot, compare the estimated SIR with the target SIR.

Embodiments of the present invention described herein provide for estimation of the signal power and interference power of a received signal in a wireless communication receiver, without the need of an amplitude reference provided by the transmission of known pilot symbols. In a preferred embodiment, the invention relates to the use of the above signal and interference power estimates in a Code Division Multiple Access (CDMA) wireless communication system. A 3GPP WCDMA/HSDPA cellular system employing a Release 6 F-DPCH channel will be considered as a non-limiting case to exemplify the application of the present invention. In one embodiment, the method is used at a User Equipment (UE) receiver of a 3GPP HSDPA cellular system, to estimate the signal power and interference power of the Fractional Dedicated Physical Channel (F-DPCH), based on the TPC field of the F-DPCH transmitted in the downlink. The estimation of the interference power of the F-DPCH may be improved by using the entire F-DPCH slot, including fields corresponding to the TPC symbols of F-DPCH channels transmitted to other users, which share the same downlink spreading code. In other embodiments, the method may be used at the UE receiver of a 3GPP WCDMA cellular system, to improve the estimation of the signal power and interference power based on unknown TPC symbols and known pilot symbols present on a Dedicated Physical Control Channel (DPCCH).

In an embodiment of the invention the estimated signal power and the estimated interference power of the received signal may be used to adjust one or more parameters related to the receiver architecture or the receiver implementation. For example, the receiver may be configured to decode a received signal according to one of a plurality of signal processing functions, such as a rake receiver function or an equaliser function. Other signal processing functions that could be used to decode a received signal would be known to a person skilled in the art. The choice of which signal processing function to implement in order to decode a received signal may be based, wholly or partly, on the estimated signal power, the estimated interference power or the ratio of the signal and interference powers. Other aspects of the receiver architecture or the receiver implementation may be adjusted based on the estimated signal power, the estimated interference power or the ratio of the signal and interference powers. These other aspects would be apparent to a person skilled in the art.

Reference is first made to FIG. 1, which is a schematic block diagram showing the dataflow in a wireless receiver 100 for a digital communications system according to a preferred embodiment of the present invention. The wireless receiver 100 comprises an antenna 102, Radio Frequency (RF) and Intermediate Frequency (IF) stages 106, a receiver front end 108, a signal detector 110, a signal and interference power estimator block 112, a Log-Likelihood Ratio (LLR) calculation block 114, a deinterleaver and channel decoder block 116 and a transmit power control (TPC) block 118. The antenna 102 is arranged to receive an incoming signal 104, and has an output coupled to an input of the RF and IF stages 106. The RF and IF stages 106 have an output coupled to an input of the receiver front end 108. The receiver front end has an output coupled to an input of the signal detector 110. The signal detector 110 has an output coupled to an input of the signal and interference power estimator block 112. The signal and interference power estimator block 112 has a first output coupled to a first input of the LLR calculation block 114. The LLR calculation block 114 has a second input coupled to the output of the signal detector 110. The LLR calculation block has an output coupled to an input of the deinterleaver and channel decoder block 116. The output of the deinterleaver and channel decoder block 116 is a decoded signal. The signal and interference power estimator block 112 has a second output coupled to an input of the TPC block 118. The TPC block 118 outputs TPC signals which may be transmitted to other nodes in the wireless network in order to control the power of transmissions sent from the other nodes. The TPC signals may be transmitted to the other nodes via a transmitting antenna. In some embodiments this antenna is the antenna 102 used by the wireless receiver 100 to receive the incoming signal 104.

In operation the antenna 102 receives the incoming signal 104 over a wireless communication channel. The incoming signal 104 is supplied to the RF and IF stages 106. The RF and IF stages 106 supply a baseband signal to the receiver front end 108. Analogue to digital conversion takes place in the receiver front end 108. The receiver front end 108 supplies the digitized data to the signal detector 110 which generates received signal samples $y_k$ for processing in the receiver. In a WCDMA UE, the signal detector 110 can take the form of a rake receiver or a chip level equalizer with suitable descrambling and despreading components to generate DPCH or F-DPCH signal samples $y_k$ in a known manner.

In a preferred embodiment, the TPC symbols transmitted on the F-DPCH (and DPCH) comprise two TPC bits which are restricted to be identical, (e.g. either '00' or '11'), so that even though the F-DPCH is Quadrature Phase Shift Keying (QPSK) modulated, a complex representation of the TPC symbol can only be either $(1+j)$ or $-(1+j)$. Using this characteristic of the TPC symbols, at the output of the signal detector 110, the interference power and signal power of the received signal may be estimated. The signal detector 110 may perform the steps of combining and phase correction based on the phase reference provided by a Common Pilot Channel (CPICH) before outputting the signal samples $y_k$.

Figure 2:
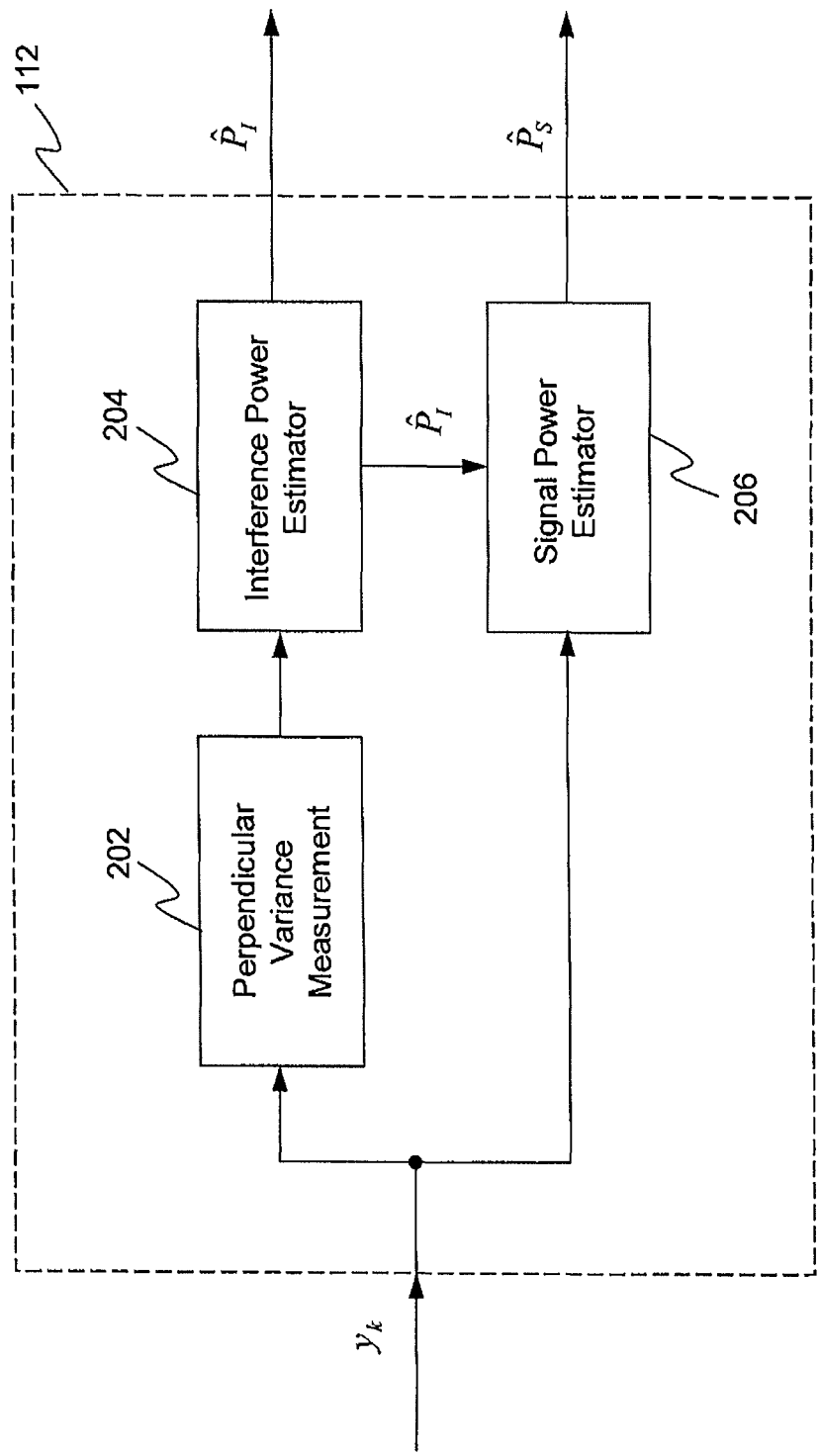
FIG. 2 is a schematic block diagram showing the functional blocks included in the signal and interference power estimator block 112 according to a preferred embodiment of the present invention.

FIG. 2 shows a schematic diagram of the functional blocks included in the signal and interference power estimator block 112 according to a preferred embodiment of the present invention, in order to provide the signal power and interference power estimates. The functional blocks included in the signal and interference power estimator block 112 may be implemented in the wireless receiver 100 as computer hardware, software or firmware. For example, the functional blocks may be implemented as a suitably programmed processor, or as code blocks ready for execution by a suitable processor.

The signal and interference power estimator block 112 comprises a perpendicular variance measurement block 202, an interference power estimator block 204, and a signal power estimator block 206. The perpendicular variance measurement block 202 is arranged to receive the received signal samples $y_k$, and has an output coupled to an input of the interference power estimator block 204. The interference power estimator block 204 has a first output coupled to a first input of the signal power estimator block 206. The interference power estimator block 204 has a second output to provide an estimate $\hat{P}_I$ of the interference power $P_I$ at the output of the signal and interference power estimator block 112. The signal power estimator block 206 has a second input arranged to receive the received signal samples $y_k$. The signal power estimator block 206 has an output to provide an estimate $\hat{P}_S$ of the signal power $P_S$ at the output of the signal and interference power estimator block 112.

In operation, the received signal samples $y_k$ are received at the perpendicular variance measurement block 202. A measure of the interference power of the received signal is given by the variance of the component of the received signal that is perpendicular to the direction defined by the possible TPC symbols. The variance of the component of the received signal that is perpendicular to the direction in the complex plane defined by the possible TPC symbol values (e.g., $(1+j)$ and $-(1+j)$) is measured in the perpendicular variance measurement block 202. The measured perpendicular variance is then passed to the interference power estimator block 204. At the interference power estimator block 204 the interference power of the received signal is estimated from the measured variance of the component of the received signal that is perpendicular to the direction defined by the possible TPC symbols. The estimated interference power $\hat{P}_I$ is output from the signal and interference power estimator block 112.

The received signal samples $y_k$ are also received at the signal power estimator block 206. The signal power estimator block 206 may internally derive a measure of the total power of the received signal samples. Alternatively, the signal power estimator block 206 may internally derive a measure of the variance of the component of the received signal samples that is parallel to the direction in the complex plane defined by the possible TPC symbol values. Under the assumption that the interference is circularly symmetric, the interference of the received signal has the same variance in both the perpendicular and parallel components. The signal power estimator block 206 also receives the estimated interference power $\hat{P}_I$ from the interference power estimator block 204. At the signal power estimator block 206 the signal power of the received signal may be estimated from the measured total power of the received signal samples and the estimated interference power. Alternatively, the signal power of the received signal samples may be estimated from the measured variance of the component of the received signal samples that is parallel to the direction defined by the possible TPC symbols and the estimated interference power. The estimated signal power $\hat{P}_S$ is output from the signal and interference power estimator block 112. The estimated signal power $\hat{P}_S$ and the estimated interference power $\hat{P}_I$ are output from the signal and interference power estimator block 112 and input into the LLR calculation block 114 and/or the transmit power control block 118 as shown in FIG. 1.

As would be clear to a person skilled in the art, the present invention is not limited to a system in which TPC symbols can only be either $(1+j)$ or $-(1+j)$. Embodiments of the present invention include systems where the received signal comprises data containing unknown symbols transmitted from a symbol alphabet in which all of the symbols in the alphabet are complex values that lie in a line on a given direction of the complex plane. In other words, the symbols in the alphabet define a direction in the complex plane. In some embodiments of the present invention, the symbol alphabet is a binary symbol alphabet $\{a, -a\}$, $a \in C$.

We describe below the details of a preferred embodiment of the present invention. The signal samples $y_k$ output by the signal detector 110 can be expressed as $$y_k = \frac{1}{\sqrt{2}} h_k d_k + n_k \quad (1)$$

where k denotes the symbol index, $h_k$ is the gain of the equivalent channel at the receiver output, $d_k$ is the k-th transmitted TPC symbol, and $n_k = n_{k,R} + j n_{k,I}$ denotes the complex-valued interference (which is used to indicate the interference plus noise throughout this description) at the output of the signal detector 110, which is modelled as an additive, white, circularly symmetric Gaussian noise process, with zero mean and variance $E\{|n_k|^2\} = \sigma_n^2$, where $E\{\cdot\}$ indicates statistical expectation. In the following we assume the equivalent channel $h_k$ in (1) to be real-valued and positive, $h_k \in R^+$. It is however straightforward to a person skilled in the art to extend the resulting description and implementation of the algorithm to the general case where $h_k$ can assume any complex value.

The received signal power of the k-th transmitted TPC symbol is given by $P_s = E\{h_k^2\}$ (where $E\{h_k^2\} = h_k^2$ if the channel is slowly varying and can be considered stationary in the interval of interest) and the interference power is given by $P_I = \sigma_n^2$. The signal power $P_S$ and the interference power $P_I$ are estimated without knowledge of the transmitted TPC symbol $d_k$.

As described above, in the preferred embodiment, the TPC bits are restricted to be identical so that the bits mapped onto a QPSK symbol must be either '11' (for TPC command equal to 1) or '00' (for TPC command equal to 0). Considering the binary value $b_k \in \{+1, -1\}$, a TPC command 0 may be mapped to the value $b_k = +1$, and a TPC command 1 may be mapped to $b_k = -1$. In this case, the transmitted TPC symbol $d_k$ is given by $(1+j) b_k$, which can only assume the values $(1+j)$ and $-(1+j)$.

Figure 3:
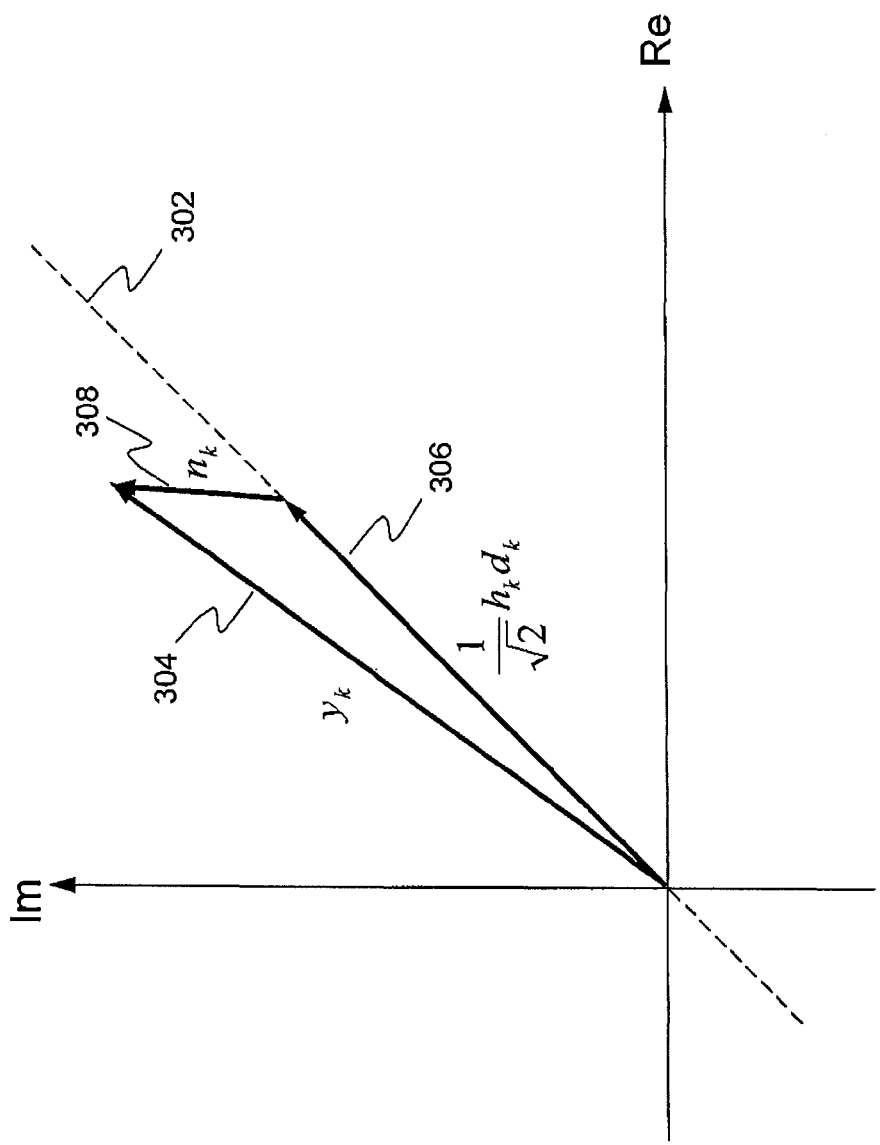
FIG. 3 shows a first representation of a signal sample in the complex plane.

FIG. 3 shows a representation of the complex plane. Line 302 shows the direction defined by the points $(1+j)$ and $-(1+j)$ which are the possible values of the transmitted TPC symbol. The received signal sample $y_k$ 304 is given by the sum of a signal component $$\frac{1}{\sqrt{2}} h_k d_k$$

306 including the transmitted TPC symbol (shown in the figure for the case where $d_k = 1+j$) and a component $n_k$ 308 representing the interference. It can be seen from FIG. 3 that for negligibly small levels of interference ($n_k \to 0$), the received signal sample 304 would equal the transmitted TPC symbol 306. It should be appreciated that the interference component vector 308 shown in FIG. 3 may have any direction in the complex plane. The interference may be an additive, white, circularly symmetric Gaussian noise.

Figure 4:
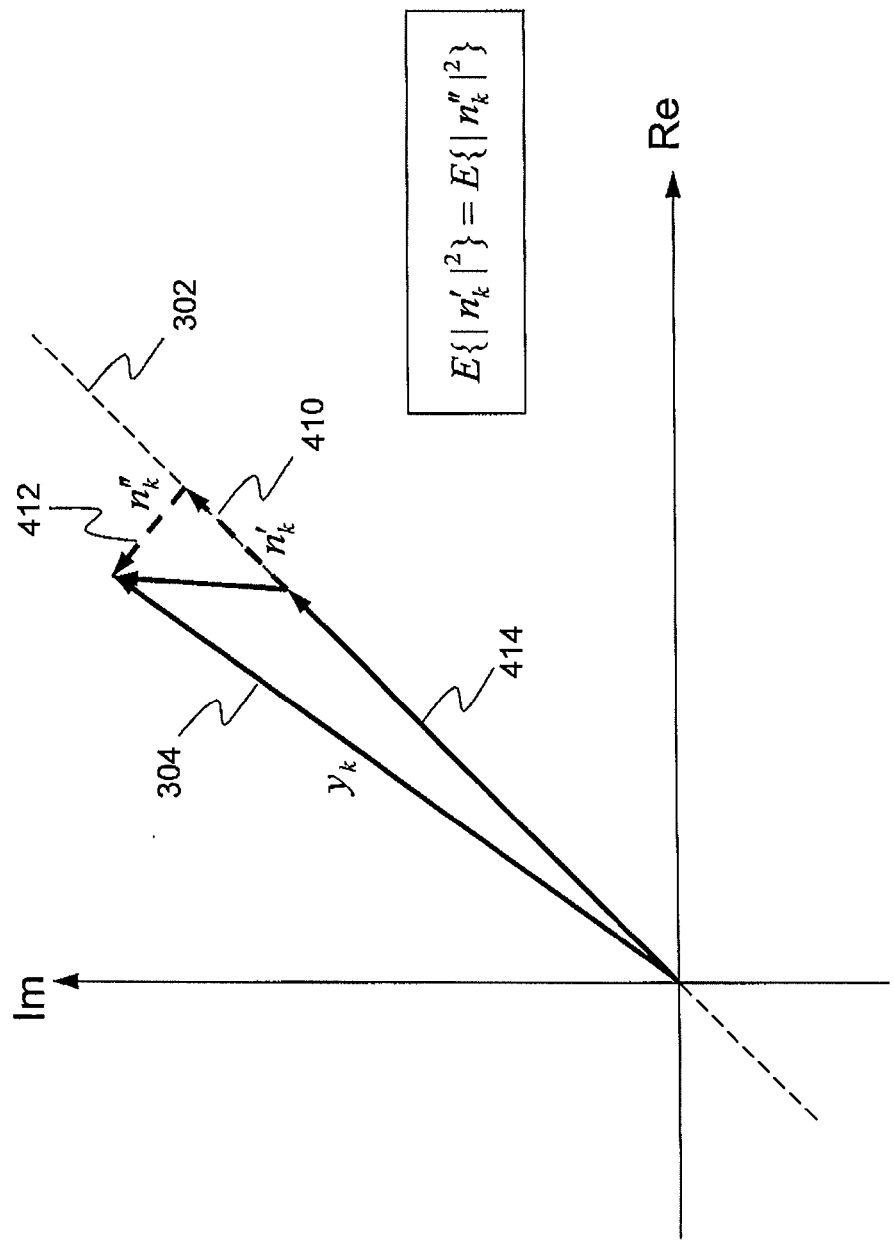
FIG. 4 shows a second representation of a signal sample in the complex plane.

FIG. 4 shows a simplified representation of the method of the preferred embodiment of the present invention. It is known that the transmitted TPC symbol lies on the axis 302. Therefore any deviation of the received signal sample $y_k$ from the axis 302 is due to interference. The component of the received signal sample that is perpendicular to the direction 302 is calculated and may be used to estimate the interference in the signal sample $y_k$. In the example shown in FIG. 4 the component 410 of the interference parallel to the direction 302 is represented by the vector $n'_k$, while the component 412 of the interference perpendicular to the direction 302 is represented by the vector $n''_k$. It is assumed that the interference is circularly symmetric, so that the component of the interference parallel to the axis 302 has the same variance as the component of the interference perpendicular to the axis 302. In other words $E\{|n'_k|^2\} = E\{|n''_k|^2\}$. It follows that the total received power is given by the signal power (i.e. the power of the received data, e.g. the power of the received TPC symbols) plus the interference power. It also follows that the interference power is given by the sum of the power of the two equal-powered components in the perpendicular and parallel directions with respect to the axis 302, and can be equivalently derived from the power of one of the two components, e.g., the component in the direction perpendicular to the direction 302.

Figure 5:
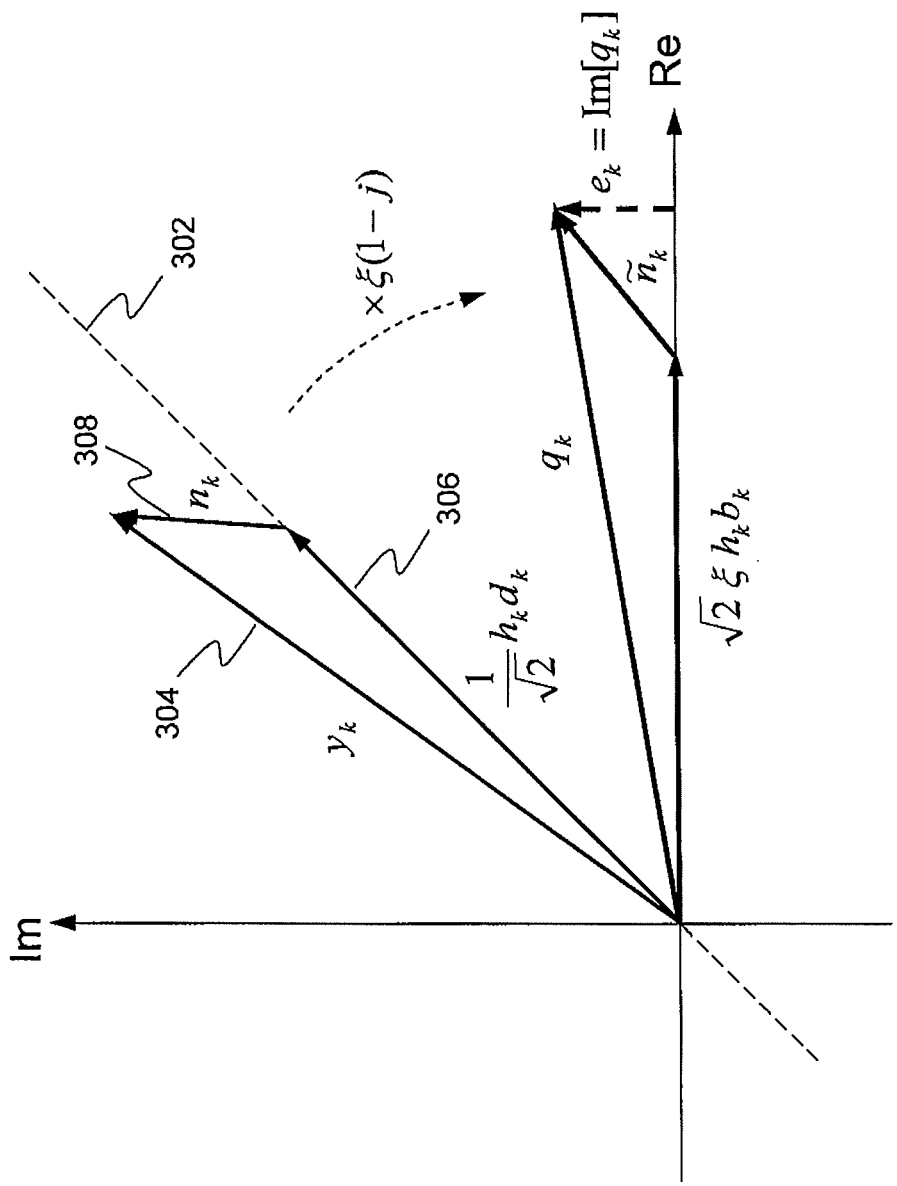
FIG. 5 shows a third representation of a signal sample in the complex plane.

The proposed method for the estimation of the signal power and the interference power based on the received TPC samples in a preferred embodiment can be formalized according to the following exemplary two-step procedure:

In the first step of the exemplary two-step procedure, in order to calculate the interference plus noise power, $P_I = \sigma_n^2$, $y_k$ is rotated by 45°, as shown in FIG. 5, to bring the signal part onto the real axis of the complex plane. This is achieved for example by multiplying $y_k$ by $\xi(1-j)$, where $\xi$ is a suitable real positive constant, to obtain the quantity $q_k$, where $$q_k = \xi(1-j)y_k \quad (2)$$
$$= \xi(1-j)\left[\frac{1}{\sqrt{2}} h_k (1+j) b_k + n_k\right]$$
$$= \sqrt{2} \xi h_k b_k + \tilde{n}_k$$

where the rotated noise $\tilde{n}_k$ is given by $$\tilde{n}_k = \xi(1-j)n_k = \xi[(n_{k,R}+n_{k,I})+j(n_{k,I}-n_{k,R})]. \quad (3)$$

Using Equations 2 and 3, we define the new quantity $e_k$ as $$e_k = \text{Im}[q_k] = \text{Im}[\tilde{n}_k] = \xi(n_{k,I}-n_{k,R}). \quad (4)$$

$e_k$ does not depend on the value of $b_k$ since the signal part of $q_k$ is purely real. Given that the real and imaginary parts of the interference, $n_{k,R}$ and $n_{k,I}$, are assumed to be uncorrelated (such that $E\{n_{k,R} \cdot n_{k,I}\} = 0$), the expectation of the square of $e_k$ divided by the multiplication factor $\xi^2$ is simply $$\frac{1}{\xi^2} E\{e_k^2\} = n_{k,R}^2 + n_{k,I}^2 = E\{|n_k|^2\} = \sigma_n^2. \quad (5)$$

Equation 5 provides an estimate of the interference power $P_I = \sigma_n^2$ without knowledge of the transmitted symbol $d_k$. In a practical implementation, assuming an ergodic interference process (e.g., a process for which the ensemble statistics can be computed on the basis of a single sample realization of the process), the statistical expectation (ensemble average) may be replaced by a sample average over the observation set $\{y_k\}_{k=k_0+1}^{k_0+N}$ $$\hat{P}_I = \frac{1}{\xi^2} \frac{1}{N} \sum_{k=k_0+1}^{k_0+N} e_k^2 = \frac{1}{\xi^2} \frac{1}{N} \sum_{k=k_0+1}^{k_0+N} (\text{Im}[q_k])^2. \quad (6)$$

Choosing the value $\xi=1$, for example, gives $$q_k = (1-j) \cdot y_k \quad (7)$$

$$P_I = \sigma_n^2 = E\{(\text{Im}[q_k])^2\} \quad (8)$$

$$\hat{P}_I = \frac{1}{N} \sum_{k=k_0+1}^{k_0+N} (\text{Im}[q_k])^2. \quad (9)$$

The F-DPCH contains only one TPC symbol per user per slot, so N=1 in equations 6 and 9 unless the observation set can be expanded. One way to expand the observation set is to exploit a property of the F-DPCH (note that this is not a property of the DPCH): all F-DPCHs from the same cell employ the same scrambling and spreading codes which means that, although the TPC bits transmitted to each UE are different, the rotated TPC symbols must all be real. Therefore any imaginary component of the rotated signal sample must be due to interference. In this way, the estimate of the interference power may make use of all of the symbols of each slot (e.g. 10 symbols per slot), thereby allowing the interference power (equal to the variance of the imaginary component) to be estimated with greater confidence. Note that the estimate of the signal power (i.e. the power of the received data) from a UE should still be made on the single TPC symbol belonging to the UE. Alternatively, or in addition, some form of time averaging filter (e.g., a finite impulse response (FIR) or an infinite impulse response (IIR) filter) can be applied to the interference power to determine a long term average, in order to ensure that the interference power estimated from the perpendicular component is also representative of that on the parallel component (under the assumption that the interference is circularly symmetric).

One exception to the applicability of the above property is due to the possibility that other UEs sharing the F-DPCH scrambling and spreading code may be transmitted with a different phase reference (e.g., the secondary CPICH instead of the primary CPICH). In this case, to be able to use other symbols in the slot for the purpose of estimating the interference power, the receiver would need to estimate the phase of the TCP symbol of each of the other UEs, and apply a suitable de-rotation of the received samples depending on the estimated phase. This de-rotation may be different for the different symbols of the slot (i.e., for the TPC symbols of different UEs).

In the second step of the exemplary two-step procedure, an estimate $\hat{P}_S$ of the TPC symbol power $P_S = E\{h_k^2\}$ can be found by considering that the total signal-plus-interference power (the total received power) $P_T$ at the output of the signal detector 110 can be expressed as $$P_T = E\{|y_k|^2\} = E\{h_k^2\} + \sigma_n^2 = P_S + P_I, \quad (10)$$

and therefore $$P_S = E\{h_k^2\} = P_T - P_I \approx E\{|y_k|^2\} - \hat{P}_I. \quad (11)$$

Equation 11 provides an estimate of the TPC symbol power $P_S$, without knowledge of the transmitted symbol $d_k$. In a practical implementation, statistical expectations (ensemble averages) may be replaced by sample averages over the observation set $\{y_k\}_{k=k_0+1}^{k_0+N}$, such that $$\hat{P}_S = \frac{1}{N} \sum_{k=k_0+1}^{k_0+N} |y_k|^2 - \hat{P}_I, \quad (12)$$

with $\hat{P}_I$ given by Equation 6.

Time averaging filtering (e.g., FIR or IIR filtering) can be applied to improve the reliability of the symbol power estimate. However, as the signal power, $P_S$, may change rapidly with the time variation of the propagation channel characteristics, it cannot be filtered as aggressively as the interference power estimate, $P_I$, which is typically varying more slowly in time.

For relatively high SIR, an estimate of the signal power $P_S$ may be alternatively computed by observing that $$E\{|q_k|\} = E\{|\xi h_k b_k + \tilde{n}_k|\} = \xi E\{h_k\}, \quad (13)$$

$$E\{|q_k|^2\} = E\{|\xi h_k b_k + \tilde{n}_k|^2\} \approx \xi^2 E\{h_k^2\}. \quad (14)$$

In this case, for slowly varying channels $$P_S \approx \frac{1}{\xi^2} E^2\{|q_k|\} \approx E^2\{h_k\} \quad (15)$$

or, when $h_k$ changes significantly within the observation interval $$P_S \approx \frac{1}{\xi^2} E\{|q_k|^2\} \approx E\{h_k^2\}. \quad (16)$$

The above estimated values of $P_S$ and $P_I$ may be used to estimate the signal to interference ratio (SIR) for downlink power control. Alternatively or additionally, the estimated SIR may be used for other purposes including LLR calculation and determination of in-sync/out-of-sync conditions.

The principles of the present invention have been described above in which estimates of signal and interference power are generated directly from measurements of a received control channel signal, without relying on pilot symbols or a reference channel signal.

It should be noted that the interference power estimate may also be obtained using the known CPICH pilot symbols. An advantage of this approach is that, for the case of DPCH, the estimate of the interference power may make use of more symbols than are available for the TPC bit based approach. However, it should be noted that in a multipath environment the intercell interference component, due to code non-orthogonality, will be different for the CPICH and the F-DPCH/DPCH.

The estimate of the signal power and the estimate of the interference power derived according to the present invention may be employed for a number of purposes. In particular, the estimated signal and interference powers may be used in processing the received signal and/or for generating control information related to the transmission of a signal from the wireless receiver.

In this regard, the generated control information may be a control signal that is to be transmitted, such as a TPC symbol. Alternatively, the generated control information may control the manner in which a signal is transmitted from the wireless receiver. For example, the power with which a signal is transmitted may be controlled using the generated control information. A signal whose transmission is controlled using the generated control information does not necessarily have to be a control signal, and may be any type of signal, such as a data signal.

The estimates of the signal and interference powers may be used in the calculation of reliability information, for example in the form of a log-likelihood ratio, which is typically used for channel decoding, but has other potential uses as would be known to a person skilled in the art. The estimates of the signal and interference powers may be compared with thresholds to determine out-of-sync/in-sync conditions, i.e. to determine whether to terminate a link on which the signal is received. In this way, if the interference power exceeds an interference threshold value, or if the estimated signal power is less than a signal threshold value, or if the ratio of the estimated signal power to the estimated interference power is less than a SIR threshold value, then the link may be terminated, and otherwise the link may not be terminated.

The estimates of the signal and interference powers may be used for determination or scaling of thresholds for the selection of different channel estimation algorithms. This may include the selection of the channel estimation filter and/or the selection of the channel estimation window and/or the determination of a channel estimation threshold (e.g., for zeroing of the channel estimation coefficients that are below the threshold). The estimates of the signal and interference powers may also be used for diverting processing resources.

The estimates of the signal and interference powers may also be used for selecting a different receiver processing or detection algorithm. For example, in a cellular CDMA receiver (e.g., a WCDMA/HSPA receiver) this may include the selection of rake receiver or equalizer processing, or the selection of different equalization algorithms, or the selection of different equalizer parameters. The estimates of the signal and interference powers may also be used for selecting a different timing synchronization algorithm or a different frequency synchronization algorithm.

As more specific examples, the estimates of the signal and interference powers may also be used for:

Estimation of SIR for use in transmit power control in a system employing an F-DPCH channel;

Improved SIR estimation (or reducing the number of pilot symbols required) in a system employing a DPCH channel with both TPC and known pilot symbols;

Improved estimation of signal and interference powers for use in the calculation of bit reliability information (LLRs) to be input to a soft channel decoder (e.g., soft-in-soft-out MAP Turbo decoder or soft-in-hard-out Viterbi decoder), in a system employing a DPCH channel with both TPC and known pilot symbols;

Estimation of signal and interference powers for use in the calculation of bit reliability information (LLRs) for TPC commands wherein a TPC "down" command must exceed some reliability threshold before it is accepted; or Estimation of SIR (and thus bit error rate) on TPC commands for use in determining if a radio link is in- or out-of-sync.

The present invention can be applied to the F-DPCH channel, where no pilot or training symbols are available. It can also be applied to the DPCH channel, to boost performance when used in conjunction with pilot symbols. Compared with other methods, the solution provided by embodiments of the present invention has the additional advantage that it is simple to implement.

It will be appreciated that the above embodiments are described only by way of example. Other applications and configurations may be apparent to the person skilled in the art given the disclosure herein. The scope of the invention is not limited by the described embodiments, but only by the following claims.

The invention claimed is:

1. A method of operating a wireless receiver in a wireless communication network, the method comprising:
   receiving a signal, the received signal comprising data containing at least one symbol from a symbol alphabet, the symbol alphabet consisting of complex values that define a direction in the complex plane, the received signal further comprising interference;
   measuring the variance of a first component of the received signal that is perpendicular to the defined direction in the complex plane;
   estimating the interference power of the received signal using the measured variance of the first component of the received signal;
   estimating a total power of the received signal;
   estimating the power of the at least one symbol of the received signal by subtracting the estimated interference power from the estimated total power of the received signal; and
   based on the estimated interference power and the estimated power of the at least one symbol of the received signal, performing the step of:
      processing the received signal, and wherein the step of processing the received signal comprises the steps of: decoding the received signal, calculating reliability information, determining or scaling threshold values for the selection of one of a plurality of channel estimation algorithms, diverting processing resources, selecting one of a plurality of receiver processing or detection algorithms, and selecting one of a plurality of timing or frequency synchronization algorithms.

2. The method of claim 1 wherein the symbol alphabet is a binary symbol alphabet consisting of a first complex value and a second complex value, the second complex value being the negative of the first complex value.

3. The method of claim 1 wherein the symbols are Transmit Power Control symbols which indicate whether the power of the transmission from the wireless receiver should be increased or decreased.

4. The method of claim 1 further comprising measuring the variance of the received signal, wherein the total power of the received signal is estimated using the measured variance of the received signal.

5. The method of claim 1 further comprising measuring the variance of a second component of the received signal that is parallel to the defined direction in the complex plane, wherein the total power of the received signal is estimated using the measured variance of the second component of the received signal.

6. The method of claim 1 further comprising estimating a signal to interference ratio of the received signal using the estimated interference power and the estimated power of the at least one symbol of the received signal, wherein the step of decoding the received signal or the step of controlling the transmission is performed in dependence on the estimated signal to interference ratio.

7. The method of claim 1 wherein the received signal contains a plurality of fractional dedicated physical channels sharing one channelization code and wherein the interference power of the received signal is estimated using the received signal on each of the fractional dedicated physical channels.

8. The method of claim 7 further comprising estimating a phase of the received signal on each of the fractional dedicated physical channels and applying a respective suitable de-rotation to the received signal on each of the fractional dedicated physical channels in dependence on the respective estimated phases.

9. The method of claim 1-further comprising applying a time averaging filter to at least one of the estimated interference power and the estimated power of the at least one symbol of the received signal.

10. The method of claim 1 wherein pilot symbols are received on a dedicated physical channel to provide an amplitude reference for use in estimating the interference power and in estimating the power of the at least one symbol of the received signal.

11. The method of claim 1 further comprising calculating bit reliability information using the estimated interference power and the estimated power of the at least one symbol of the received signal, wherein the received signal is decoded in dependence on the calculated reliability information.

12. The method of claim 1 further comprising determining whether to terminate a link on which the signal is received based on the estimated interference power and the estimated power of the at least one symbol.

13. A wireless receiver for use in a wireless communication network, the apparatus comprising:
   means for receiving a signal, the received signal comprising data containing at least one symbol from a symbol alphabet, the symbol alphabet consisting of complex values that define a direction in the complex plane, the received signal further comprising interference;
   means for measuring the variance of a first component of the received signal that is perpendicular to the defined direction in the complex plane;
   means for estimating the interference power of the received signal using the measured variance of the first component of the received signal;
   means for estimating a total power of the received signal;
   means for estimating the power of the at least one symbol of the received signal by subtracting the estimated interference power from the estimated total power of the received signal; and
   means for performing, based on the estimated interference power and the estimated power of the at least one symbol of the received signal, step of:
      processing the received signal, wherein the step of processing the received signal comprises the steps of: decoding the received signal, calculating reliability information, determining or scaling threshold values for the selection of one of a plurality of channel estimation algorithms, diverting processing resources, selecting one of a plurality of receiver processing or detection algorithms, and selecting one of a plurality of timing or frequency synchronization algorithms.

14. The receiver of claim 13 wherein the symbol alphabet is a binary symbol alphabet consisting of a first complex value and a second complex value, the second complex value being the negative of the first complex value.

15. The receiver of claim 13 wherein the symbols are Transmit Power Control symbols which indicate whether the power of the transmission from the wireless receiver should be increased or decreased.

16. The receiver of claim 13 further comprising means for measuring the variance of the received signal, wherein the total power of the received signal is estimated using the measured variance of the received signal.

17. The receiver of claim 13 further comprising means for measuring the variance of a second component of the received signal that is parallel to the defined direction in the complex plane, wherein the total power of the received signal is estimated using the measured variance of the second component of the received signal.

18. The receiver of claim 13 further comprising means for estimating a signal to interference ratio of the received signal using the estimated interference power and the estimated power of the at least one symbol of the received signal, wherein the step of decoding the received signal or the step of controlling the transmission is performed in dependence on the estimated signal to interference ratio.

19. The receiver of claim 13 wherein the received signal contains a plurality of fractional dedicated physical channels sharing one channelization code and wherein the means for estimating interference power of the received signal uses the received signal on each of the fractional dedicated physical channels.

20. The receiver of claim 19 further comprising means for estimating a phase of the received signal on each of the fractional dedicated physical channels and means for applying a respective suitable de-rotation to the received signal on each of the fractional dedicated physical channels in dependence on the respective estimated phases.

21. The receiver of claim 13 further comprising means for applying a time averaging filter to at least one of the estimated interference power and the estimated power of the at least one symbol of the received signal.

22. The receiver of claim 13 wherein pilot symbols are received on a dedicated physical channel to provide an amplitude reference for use by the means for estimating the interference power and the means for estimating the power of the at least one symbol of the received signal.

23. The receiver of claim 13 further comprising means for calculating bit reliability information using the estimated interference power and the estimated power of the at least one symbol of the received signal, wherein processing the received signal comprises decoding the received signal, and the received signal is decoded in dependence on the calculated reliability information.

24. The receiver of claim 13 further comprising means for determining whether to terminate a link on which the signal is received based on the estimated interference power and the estimated power of the at least one symbol.

25. A non-transient computer readable medium comprising computer readable instructions for execution by a processor to perform a method of operating a wireless receiver in a wireless communication network, the method comprising:
   receiving a signal, the received signal comprising data containing at least one symbol from a symbol alphabet, the symbol alphabet consisting of complex values that define a direction in the complex plane, the received signal further comprising interference;
   measuring the variance of a first component of the received signal that is perpendicular to the defined direction in the complex plane;
   estimating the interference power of the received signal using the measured variance of the first component of the received signal;
   estimating a total power of the received signal;
   estimating the power of the at least one symbol of the received signal by subtracting the estimated interference power from the estimated total power of the received signal; and based on the estimated interference power and the estimated power of the at least one symbol of the received signal, performing the step of:
processing the received signal, wherein the step of processing the received signal comprises the steps of: decoding the received signal, calculating reliability information, determining or scaling threshold values for the selection of one of a plurality of channel estimation algorithms, diverting processing resources, selecting one of a plurality of receiver processing or detection algorithms, and selecting one of a plurality of timing or frequency synchronization algorithms.

26. A wireless receiver for use in a wireless communication network, the apparatus comprising:
means for receiving a signal, the received signal comprising data containing at least one symbol from a symbol alphabet, the symbol alphabet consisting of complex values that define a direction in the complex plane, the received signal further comprising interference;
means for measuring the variance of a first component of the received signal that is perpendicular to the defined direction in the complex plane;
means for estimating the interference power of the received signal using the measured variance of the first component of the received signal; means for estimating a total power of the received signal;
means for estimating the power of the at least one symbol of the received signal by subtracting the estimated interference power from the estimated total power of the received signal wherein pilot symbols are received on a dedicated physical channel to provide an amplitude reference for use by the means for estimating the interference power and the means for estimating the power of the at least one symbol of the received signal; and
means for performing, based on the estimated interference power and the estimated power of the at least one symbol of the received signal, at least one of the steps of: processing the received signal, and generating control information related to the transmission of a further signal from the wireless receiver.

27. A wireless receiver for use in a wireless communication network, the apparatus comprising:
means for receiving a signal, the received signal comprising data containing at least one symbol from a symbol alphabet, the symbol alphabet consisting of complex values that define a direction in the complex plane, the received signal further comprising interference;
means for measuring the variance of a first component of the received signal that is perpendicular to the defined direction in the complex plane;
means for estimating the interference power of the received signal using the measured variance of the first component of the received signal; means for estimating a total power of the received signal;
means for estimating the power of the at least one symbol of the received signal by subtracting the estimated interference power from the estimated total power of the received signal;
means for performing, based on the estimated interference power and the estimated power of the at least one symbol of the received signal, at least one of the steps of: processing the received signal, and generating control information related to the transmission of a further signal from the wireless receiver; and
means for calculating bit reliability information using the estimated interference power and the estimated power of the at least one symbol of the received signal, wherein processing the received signal comprises decoding the received signal, and the received signal is decoded in dependence on the calculated reliability information.

* * * * *